(12) United States Patent
Sederquist et al.

(10) Patent No.: US 6,759,016 B2
(45) Date of Patent: Jul. 6, 2004

(54) COMPACT MULTIPLE TUBE STEAM REFORMER

(75) Inventors: Richard Sederquist, Middletown, CT (US); Alakh Prasad, Coquitlam (CA); Biraj Bora, Vancouver (CA); Andreas Gubner, Hambach (DE)

(73) Assignee: Ballard Power Systems Inc., Burnaby (CA)

( * ) Notice: Subject to any disclaimer, the term of this patent is extended or adjusted under 35 U.S.C. 154(b) by 370 days.

(21) Appl. No.: 09/994,108

(22) Filed: Nov. 26, 2001

(65) Prior Publication Data

US 2002/0136677 A1 Sep. 26, 2002

Related U.S. Application Data

(63) Continuation-in-part of application No. 09/727,224, filed on Nov. 30, 2000, now abandoned.

(51) Int. Cl.[7] .............................. B01J 8/00; B01J 8/02
(52) U.S. Cl. ...................... 422/196; 422/193; 422/194; 422/198; 48/127.9
(58) Field of Search ........................... 48/127.9, 197 R, 48/198.1, 198.7; 422/187, 188, 189, 193, 194, 195, 196, 197, 198, 211

(56) References Cited

U.S. PATENT DOCUMENTS

| | | | |
|---|---|---|---|
| 4,203,950 A | 5/1980 | Sederquist | 422/197 |
| 4,861,347 A | 8/1989 | Szydlowski et al. | 48/61 |
| 4,861,348 A | * 8/1989 | Koyama et al. | 48/94 |
| 4,935,037 A | 6/1990 | Koyama et al. | 48/94 |
| 5,106,590 A | 4/1992 | Hopper et al. | 422/198 |
| 5,181,937 A | * 1/1993 | Karafian et al. | 48/95 |
| 5,484,577 A | 1/1996 | Buswell et al. | 422/211 |
| 5,516,344 A | 5/1996 | Corrigan | 48/127.9 |
| 5,718,881 A | 2/1998 | Sederquist et al. | 423/652 |
| 5,931,658 A | 8/1999 | Sederquist et al. | 431/207 |
| 5,980,596 A | 11/1999 | Hershkowitz et al. | 48/127.9 |

FOREIGN PATENT DOCUMENTS

| | | |
|---|---|---|
| DE | 3726875 A | 5/1988 |
| DE | 19534433 C | 10/1996 |
| GB | 2238349 A | 5/1991 |
| JP | 08-203551 | 8/1996 |
| WO | WO 00/29092 | 5/2000 |
| WO | WO 01/25141 | 4/2001 |

\* cited by examiner

*Primary Examiner*—Kiley Stoner
*Assistant Examiner*—Len Tran
(74) *Attorney, Agent, or Firm*—McAndrews, Held & Malloy, Ltd.

(57) ABSTRACT

A compact, multitube steam reformer converts a fuel into a reformate stream comprising hydrogen. In one embodiment, the reformer comprises a closed vessel and a burner disposed within the vessel. The burner comprises a start fuel manifold for receiving and distributing a start fuel stream, an oxidant manifold for receiving and distributing an oxidant stream, and a burner fuel manifold for receiving and distributing a burner fuel stream. The oxidant manifold comprises a plurality of oxidant distribution tubes, each having an inlet end and an outlet end, disposed in a separator member. The burner fuel manifold comprises a plurality of burner fuel distribution tubes, each having an inlet end and an outlet end. The burner fuel distribution tubes extend through the start fuel manifold and the oxidant manifold and are fluidly isolated therefrom. The outlet end of each of the burner fuel distribution tubes extends into the inlet end of a corresponding oxidant distribution tube, thereby forming a gap between the outer wall of the burner fuel distribution tube and the inner wall of the oxidant distribution tube. The start fuel manifold has one or more openings therein associated with at least a portion of the burner fuel distribution tubes.

34 Claims, 3 Drawing Sheets

COMPACT MULTIPLE TUBE STEAM REFORMER

CROSS-REFERENCE TO RELATED APPLICATION(S)

This application is a continuation-in-part of U.S. patent application Ser. No. 09/727,224 filed on Nov. 30, 2000, now abandon. The '224 application is incorporated herein by reference in its entirety.

FIELD OF THE INVENTION

The present invention relates to steam reformers. More particularly, the present invention relates to steam reformers for catalytically converting a fuel into a reformate stream comprising hydrogen. The present steam reformer incorporates multiple reformer tubes and a multiple element burner.

BACKGROUND OF THE INVENTION

A catalytic hydrocarbon fuel steam reformer converts a fuel stream, comprising, for example, desulfurized natural gas, light distillates, methanol, propane, naphtha, kerosene, and/or combinations thereof, and water vapor into a hydrogen-rich reformate stream. The hydrogen-rich reformate stream is generally suitable for use as a fuel gas stream directed to the anode of a fuel cell after passing through a water gas shift reactor and other purification means such as a carbon monoxide selective oxidizer or a pressure swing absorption ("PSA") unit. In the conversion process, the raw hydrocarbon fuel stream is typically flowed through a catalyst bed or beds contained within reactor tubes mounted in a reformer vessel. The catalytic conversion process is normally carried out at elevated catalyst temperatures in the range of about 600° C. to about 800° C. Such elevated temperatures are typically generated by the heat of combustion from a burner incorporated into the reformer.

The search for alternative power sources has focused attention on the use of fuel cells to generate electrical power. Unlike conventional fossil fuel power sources, fuel cells are capable of generating electrical power from a fuel stream and an oxidant stream without producing substantial amounts of undesirable byproducts, such as sulfur oxides, nitrogen oxides or carbon monoxide. However, the commercial viability of fuel cell systems depends in part on the ability to efficiently and cleanly convert conventional hydrocarbon fuel sources, such as natural gas (methane) or methanol, for example, to a hydrogen-rich reformate gas stream. Properly designed catalytic steam reformers can generate the required reformate gas streams with increased reliability and decreased cost.

As to reliability and cost, conventional industrial catalytic steam reformers have at least two major disadvantages with respect to fuel cell use. First, because conventional industrial reformers operate at very high temperatures and pressure differentials, the reformer tubes that contain the catalyst must be constructed of rugged, thick walled portions of expensive materials capable of withstanding high-temperature operating conditions. Additionally, conventional industrial steam reformers also tend to be quite large, which again impacts material costs.

Smaller steam reformers have also been designed for use in fuel cell system applications. Such steam reformers have employed single-tube and multiple-tube designs. The smaller steam reformer designs have at least two major disadvantages in fuel cell system applications.

First, current steam reformer designs tend to lack quick start-up capability, with start-up times typically of from about one to four hours. Lack of quick start-up capability can be problematic in some fuel cell applications, particularly where the reformer is expected to have a relatively short duty cycle.

Some current steam reformer designs utilize a multi-element burner, but these burners do not adequately provide for quick start-up and/or lack the flexibility to efficiently operate on multiple fuels, including for example, natural gas, fuel cell anode exhaust or PSA off-gas. For example, in a fuel cell power plant a steam reformer may be used to convert natural gas into a hydrogen-rich fuel stream, and it is desirable to have a burner capable of operating on natural gas and air (start-up mode), a reformate stream and air (transition or "hot standby" mode), and the fuel cell anode and cathode exhaust streams (normal operation mode).

Second, as part of fuel processing systems in fuel cell-related applications or merchant hydrogen production, for example, current steam reformer designs are less than cost-effective. For example, high-pressure burners and/or reformer vessels increase the parasitic load on the fuel processing system due to associated compressors, thereby decreasing efficiency and increasing cost and complexity. Conversely, in merchant hydrogen production applications, a low-pressure reformer vessel increases the fuel processing system parasitic load because of the associated process gas or syngas compressor that is required. In addition, current steam reformer designs tend to be relatively complex, resulting in increased manufacturing costs and reliability concerns.

It is desirable for a steam reformer to be able to start up relatively quickly, and to be able to operate efficiently without adding undue complexity or cost. At the same time, it is desirable for a steam reformer to be low-cost, scalable, and compatible with a variety of fuel processing systems.

SUMMARY OF THE INVENTION

A compact, multiple tube steam reformer converts a fuel into a reformate stream comprising hydrogen. In one embodiment, the present steam reformer comprises a closed vessel and a burner disposed within the vessel. The burner comprises:

(a) a burner fuel manifold for receiving and distributing a burner fuel stream, the burner fuel manifold comprising a plurality of burner fuel distribution tubes, each of the burner fuel distribution tubes having an inlet end and an outlet end, the burner fuel distribution tubes disposed in a separator member;

(b) an oxidant manifold for receiving and distributing an oxidant stream, the oxidant manifold comprising a plurality of oxidant distribution tubes, each of the oxidant distribution tubes having an inlet end and an outlet end, the oxidant distribution tubes extending through the burner fuel manifold and fluidly isolated therefrom; and (c) a start fuel manifold for receiving and distributing a start fuel stream, the start fuel manifold comprising a plurality of start fuel distribution tubes, each of the start fuel distribution tubes having an inlet end and an outlet end, the start fuel distribution tubes extending through the oxidant manifold and fluidly isolated therefrom. The outlet end of each of the oxidant distribution tubes extends into the inlet end of one of the burner fuel distribution tubes, forming a first gap between the outer wall of the oxidant distribution tube and the inner wall of the burner fuel distribution tube, and the outlet end of each of the start fuel distribution tubes extends into the inlet end of a corresponding one of the oxidant distribution tubes, forming a second gap between the outer wall of the start fuel distribution tube and the inner wall of the oxidant distribution tube.

In another embodiment, the reformer comprises a closed vessel and a burner disposed within the vessel. The burner comprises:

(a) a start fuel manifold for receiving and distributing a start fuel stream;

(b) an oxidant manifold for receiving and distributing an oxidant stream, the oxidant manifold comprising a plurality of oxidant distribution tubes, each of the oxidant distribution tubes having an inlet end and an outlet end, the oxidant distribution tubes disposed in a separator member; and (c) a burner fuel manifold for receiving and distributing a burner fuel stream, the burner fuel manifold comprising a plurality of burner fuel distribution tubes, each of the burner fuel distribution tubes having an inlet end and an outlet end, the burner fuel distribution tubes extending through the start fuel manifold and the oxidant manifold and fluidly isolated therefrom.

The outlet end of each of the burner fuel distribution tubes extends into the inlet end of a corresponding oxidant distribution tube, forming a gap between the outer wall of the burner fuel distribution tube and the inner wall of the oxidant distribution tube, and wherein the start fuel manifold has one or more openings therein associated with at least a portion of the burner fuel distribution tubes.

The burner fuel distribution tubes and oxidant distribution tubes may be arranged in a hexagonal array. The gaps formed between the burner fuel distribution tubes and the oxidant distribution tubes may be annular gaps.

The separator member of the present steam reformer may comprise insulating material. The insulating material may comprise a ceramic, for example.

In the latter embodiment of the present steam reformer, the openings in the start fuel manifold may comprise one or more discrete openings distributed around the circumference of at least a portion of the burner fuel distribution tubes. The openings may be asymmetrically distributed around the circumference of each of the burner fuel distribution tubes.

Alternatively, at least a portion of the burner fuel distribution tubes may extend through a corresponding opening in the start fuel manifold, forming at least one gap between the outer wall of each of the burner fuel distribution tubes and the corresponding opening. The gaps between the outer walls of the burner fuel distribution tubes and the corresponding openings may be annular gaps. Alternatively, the gap between at least a portion of the burner fuel distribution tubes and corresponding openings of the start fuel manifold may comprise one or more gaps distributed around the circumference of at least a portion of the burner fuel distribution tubes. In this case, the gaps may be asymmetrically distributed around the circumference of each of the burner fuel distribution tubes.

The present steam reformer may further comprise: a plenum disposed within the vessel for receiving reformate, the plenum having a floor plate; a bottom pan disposed within the plenum, the bottom pan substantially in the shape of an inverted bowl and having at least one hole therein; and, a reformate outlet extending from the floor plate into the plenum in the region defined by the cooperating surfaces of the bottom pan and the floor plate.

In another embodiment, the present steam reformer comprises:

(a) a closed vessel;

(b) a plenum disposed within the vessel for receiving reformate, the plenum having a floor plate;

(c) a bottom pan disposed within the plenum, the bottom pan substantially in the shape of an inverted bowl and having at least one hole therein; and (d) a reformate outlet extending from the floor plate into the plenum in the region defined by the cooperating surfaces of the bottom pan and the floor plate.

The present steam reformer may further comprise a plurality of substantially cylindrical reformer tubes disposed within the vessel, each of the reformer tubes comprising a concentric inner gas return tube and an outer annular catalyst bed defined by the volume between the reformer tube and the inner gas return tube. The reformer tubes may further comprise at least one stabilizer member connected to the inner gas return tube and interposed between the reformer tube and the inner gas return tube. The stabilizer member may comprise at least one annular perforated plate extending radially from the inner gas return tube, or at least one fin extending axially from the inner gas return tube, for example.

The present reformer may further comprise a vaporizer disposed within the vessel for receiving and vaporizing a stream comprising water. The vaporizer may comprise a finned tube helical coil, or a corrugated tube helical coil, for example.

DETAILED DESCRIPTION OF THE PREFERRED EMBODIMENT(S)

As used in this description and in the appended claims, "anode exhaust" means the fluid exiting from the anode side of an operating fuel cell and "cathode exhaust" means the fluid stream exiting the cathode side of an operating fuel cell. Fuel means gaseous or liquid fuels comprising aliphatic hydrocarbons and oxygenated derivatives thereof, and may further comprise aromatic hydrocarbons and oxygenated derivatives thereof. Reformate means a gas stream comprising hydrogen produced from a fuel by a steam reformer.

Oxidant means substantially pure oxygen, or a fluid stream comprising oxygen, such as air or cathode exhaust, for example. "Inverted bowl" means any structure having the overall shape of an inverted bowl and topological equivalents thereof (for example, an inverted open box or cylinder are topological equivalents of an inverted bowl), exclusive of any holes in the surface of the structure.

Figure 1:
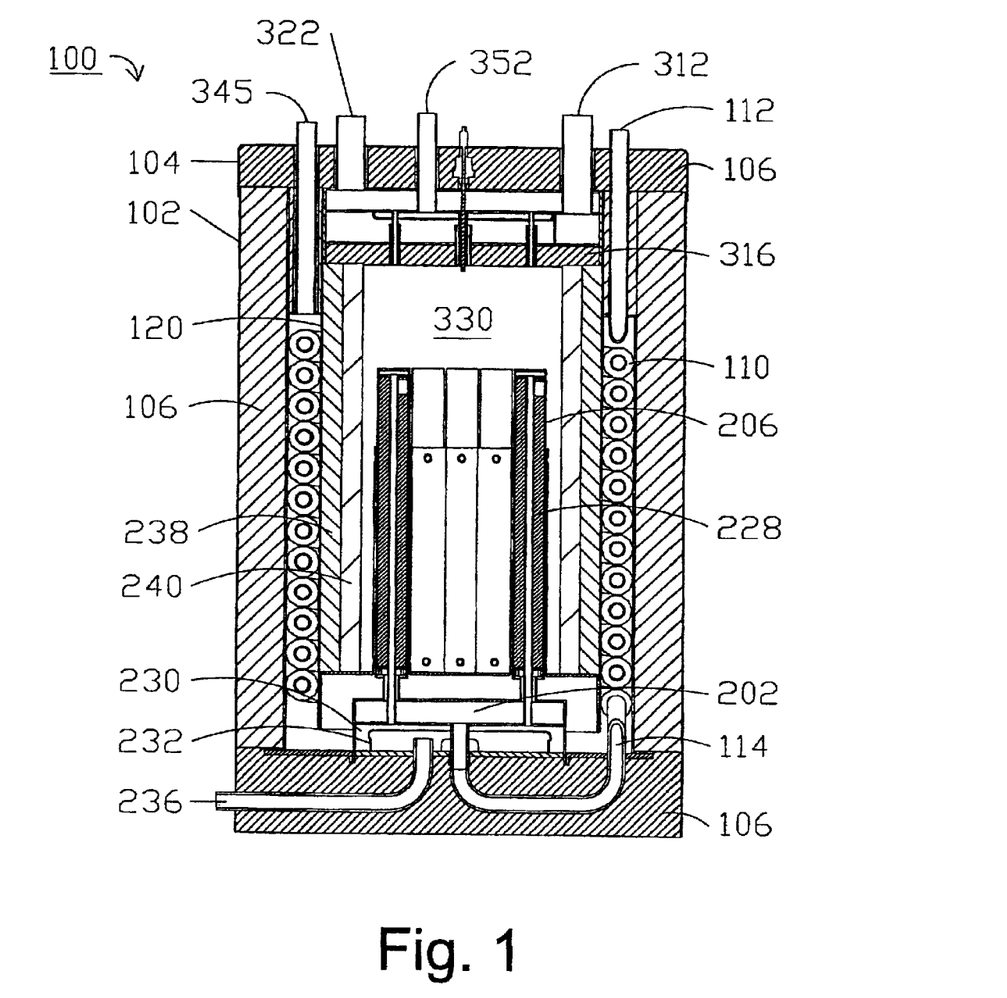
FIG. 1 is a sectional side elevation view of an embodiment of the present steam reformer.
Figure 2:
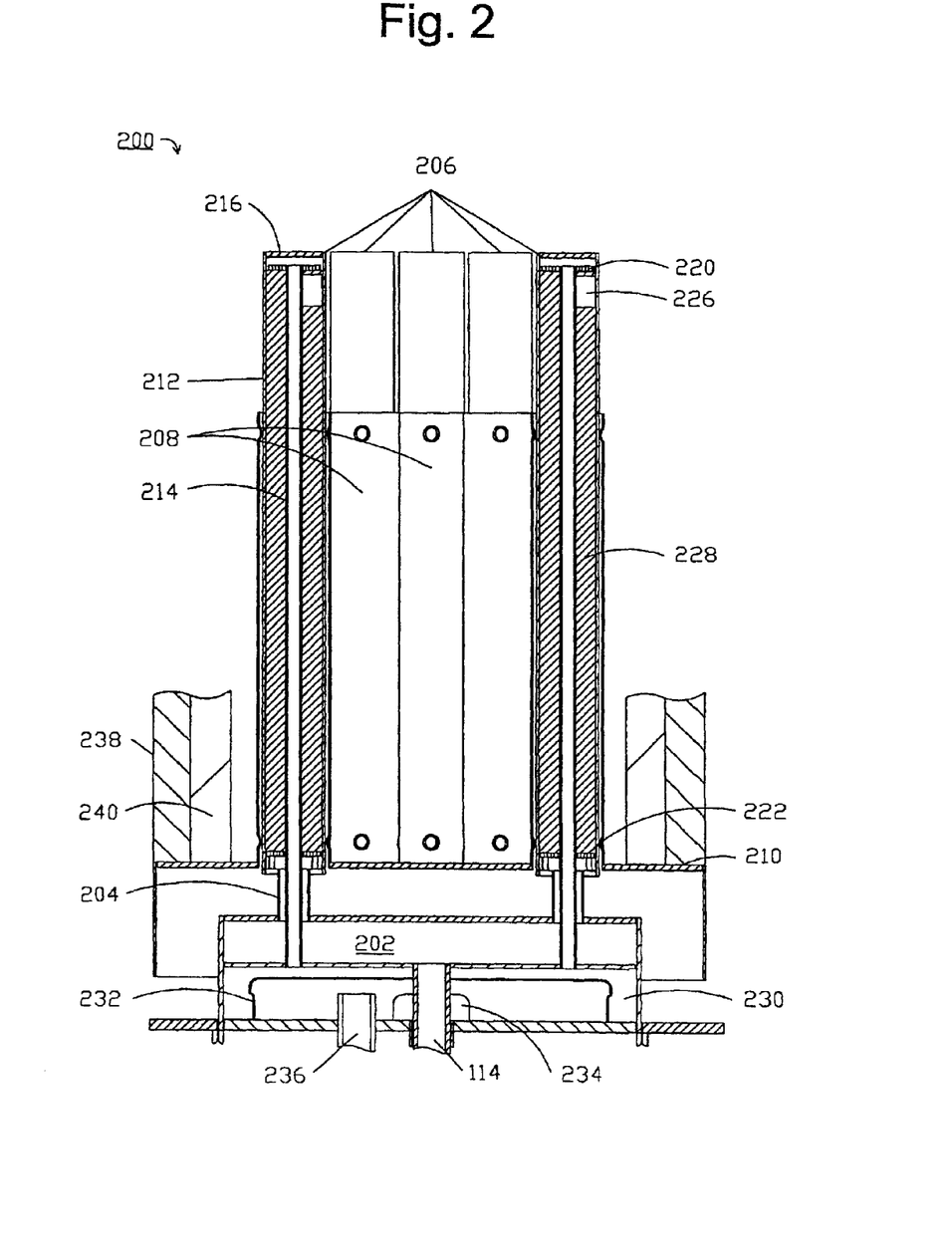
FIG. 2 is a sectional side elevation view of the reforming section of the steam reformer illustrated in FIG. 1.
Figure 3:
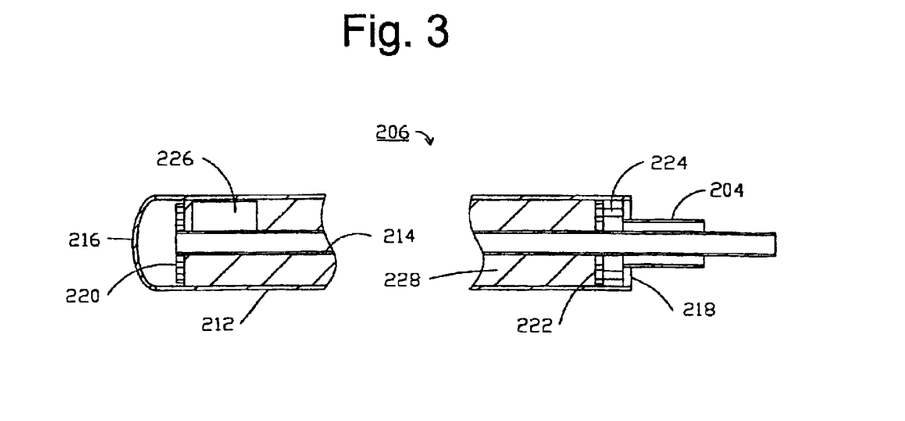
FIG. 3 is a sectional side elevation view of a reformer tube of the steam reformer illustrated in FIGS. 1 and 2.
Figure 4:
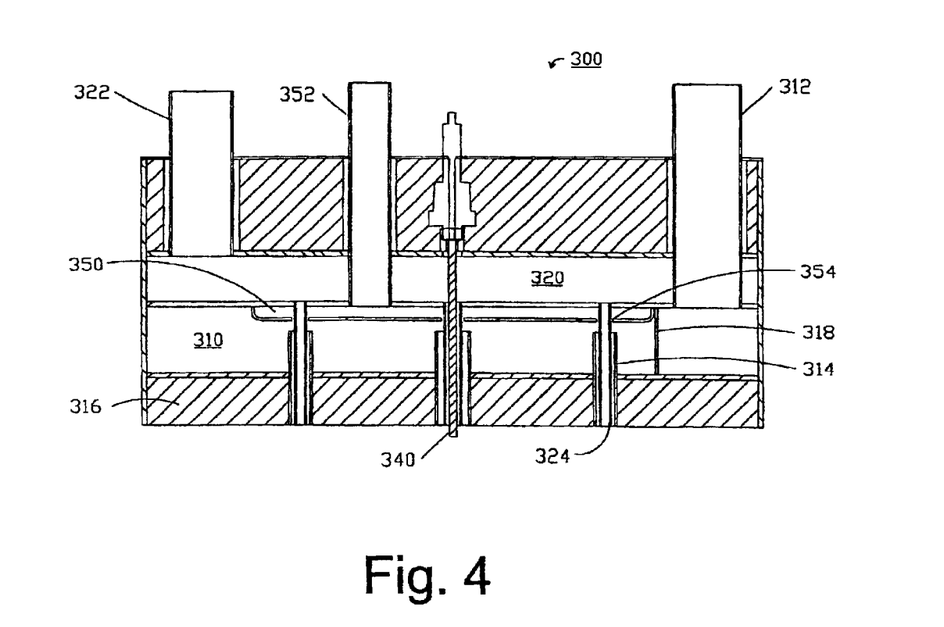
FIG. 4 is a sectional side elevation view of the burner of the steam reformer illustrated in FIG. 1.

FIG. 1 is a sectional side elevation view of an embodiment of the present steam reformer. FIGS. 2–4 are sectional side elevation views of various component assemblies of the steam reformer illustrated in FIG. 1.

As shown in FIG. 1, reformer vessel 100 comprises shell 102 and header 104. The interior walls (including the top and bottom) of vessel 100 have an insulating layer 106. Disposed within vessel 100 are vaporizer 110, and shell 120 containing reforming section 200 (see also FIGS. 2 and 3), and burner 300 (see also FIG. 4).

Vaporizer 110 comprises a heat exchange coil, which may be a finned tube or corrugated tube helical coil, for example. In operation, a pressurized mixture comprising fuel and water is fed from vaporizer inlet 112 and is injected into vaporizer 110 at a pressure in the range of 0.35 to 35 barg, preferably in the range of 0.35 to 14 barg. The fuel/water mixture flows within vaporizer 110 and is heated by heat exchange with the burner exhaust stream exiting reforming section 200 to produce a process stream comprising vaporized fuel and steam. If desired, the fuel, water, or both may be preheated before introduction into vaporizer 110 to assist in vaporization. The reactant stream exiting vaporizer 110 is supplied via vaporizer outlet 114 to reforming section 200.

Referring to FIGS. 1 and 2, the reactant stream exiting vaporizer outlet 114 is supplied to reactant plenum 202, where it is distributed via feed tubes 204 to reformer tubes 206. Reformer tubes 206 are disposed within burner tubes 208 fixed to burner tube plate 210.

As best shown in FIG. 3, each reformer tube 206 comprises outer tube 212 and inner tube 214. The upper end of outer tube 212 is fluidly sealed by end cap 216. End cap 216 and outer tube 212 may form a flat head arrangement, as illustrated in FIGS. 1 and 2, or they may form other arrangements such as an elliptical head, if desired, as illustrated in FIG. 3. Seal 218 also fluidly seals the lower end of outer tube 212 in the region between outer tube 212 and feed tube 204. Inner tube 214 is located substantially concentrically within outer tube 212 and feed tube 204. It may be maintained in this position by stabilizer members, such as perforated plates 220 and 222, respectively. Perforated plate 222 may be maintained in position by at least one foot 224, which prevents plate 222 from sliding down inner tube 214. Alternatively, or additionally, the stabilizer members may comprise fins 226 connected to inner tube 214. Outer tube 212, inner tube 214, and perforated plates 220 and 222 define catalyst bed 228.

If desired, catalyst bed 228 may extend beyond perforated plate 220. Similarly, inner tube 214 may extend beyond perforated plate 220. Further, inner tube 214 may also comprise a perforated cap on the upper end thereof, and/or the upper end of inner tube 214 may also be perforated, if desired.

Catalyst bed 228 may comprise catalyst pellets for promoting the steam reforming reaction. Alternatively, the catalyst in catalyst bed 228 may be supported on a monolith or foam. Suitable foam supports include metal foams and ceramic foams.

Reformer tubes 206 may be on the order of 2.5 to 12.5 cm (1 to 5 inch) in diameter, preferably about 2.5 to 5 cm (1 to 2 inch) in diameter. They may comprise standard, seamless, high-temperature alloy steel tubes for good dimensional control. Reformer tube spacing may be about 0.64 cm to 2.5 cm (0.25 to 1 inch) between outer tube walls, preferably about 0.76 to 1.0 cm (0.3 to 0.4 inch), to create a compact tube array.

Burner tubes 208 are slightly larger than reformer tubes 206 to create a small heat transfer gap between burner tubes 208 and corresponding reformer tubes 206. Burner tubes 208 may be about 0.64 cm to 1.3 cm (0.25 in to 0.5 inch) larger in outer diameter than the diameter of reformer tubes 206, preferably about 0.64 cm larger in outer diameter. Burner tubes 208 may comprise dimensionally controlled standard, seamless, high-temperature alloy steel tubes. Burner tubes may be of any suitable thickness, and can be in the range of standard sizes of 0.90 mm, 1.3 mm, or 1.7 mm (0.035 inch, 0.049 inch, or 0.065 inch) wall thickness, to create nominal heat transfer gaps of 2.3 mm, 1.9 mm, or 1.5 mm (0.090 inch, 0.076 inch, or 0.060 inch), respectively.

Burner tubes 208 may be attached to burner tube plate 210 by any suitable method to reduce or minimize any leakage paths of the burner gas around the heat transfer gaps between burner tubes 208 and reformer tubes 206. For example, burner tubes 208 may be fully welded, brazed, or mechanically sealed to burner tube plate 210. Alternatively, burner tubes 208 may be cut square, firmly seated and locally tack welded to burner tube plate 210.

The process stream is directed through the annular passage between feed tube 204 and inner tube 214 and is supplied to catalyst bed 228. The process stream is flowed through catalyst bed 228, where the process stream is converted into a hydrogen-rich reformate stream. The reformate stream exits catalyst bed 228 toward the top of reformer tube 206 and is directed down into inner tube 214. The reformate exits inner tube 214 and enters collection plenum 230 (see FIGS. 1 and 2).

Disposed within collection plenum 230 is bottom pan 232, which is substantially in the shape of an inverted bowl. The reformate stream enters collection plenum 230 and is directed through openings 234 in bottom pan 232 and into reformate outlet tube 236. Catalyst particles or fines entrained in the reformate stream are separated from the reformate stream due to the flow velocity of the stream as it changes direction from first being directed downwardly over bottom pan 232 and then being directed upwardly through openings 234 and then downwardly again into reformate outlet tube 236. Thus, the quantity of catalyst exiting the present reformer is reduced, and fines are accumulated on the floor of collection plenum 230 and remain for the service life of the reformer.

The reformate stream exits the reformer via reformate outlet tube 236 and may be provided to downstream equipment.

Reforming section 200 further comprises insulating layers 238 and 240, respectively. Insulating layer 240 may comprise a dense ceramic inner combustion liner.

As best shown in FIG. 4, burner 300 comprises oxidant manifold 310, fuel manifold 320, and start fuel manifold 350. Oxidant manifold 310 is supplied with an oxidant stream via oxidant manifold inlet 312. The oxidant is then directed into oxidant distribution tubes 314, which are disposed within insulating layer 316. Oxidant manifold inlet 312, oxidant manifold 310, and oxidant distribution tubes 314 may be suitably sized to ensure a substantially even distribution of the oxidant stream within each of oxidant distribution tubes 314. Oxidant manifold 310 may further comprise a distribution plate 318, comprising perforated plate, for example, to assist in providing a substantially uniform pressure drop across oxidant manifold 310, if desired. Baffles or other means for providing a substantially uniform pressure drop may also be used, and are known to persons skilled in the technology involved here.

During normal operation, burner fuel is supplied to fuel manifold 320 via fuel manifold inlet 322. The burner fuel is then directed to fuel distribution tubes 324. Fuel distribution tubes 324 extend through oxidant manifold 310 and into oxidant distribution tubes 314. Fuel distribution tubes 324 may extend into oxidant distribution tubes 314 such that each pair of tubes co-terminate, as illustrated in FIG. 4, or they may extend partly into oxidant distribution tubes 314, if desired. An annular gap may be formed between each of fuel distribution tubes 324 and oxidant distribution tubes 314. Fuel manifold inlet 322, fuel manifold 320, and fuel distribution tubes 324 may also be suitably sized to ensure a substantially equal pressure drop across each of fuel distribution tubes 314 and thus a substantially even distribution of the fuel stream within each of fuel distribution tubes 324.

Alternatively, the positions of the fuel and oxidant manifolds may be reversed, if desired. That is, the oxidant stream entering the oxidant manifold may be supplied to distribution tubes extending through the fuel manifold and into the fuel distribution tubes, and the burner fuel stream entering the fuel manifold may be directed through openings between the fuel and oxidant distribution tubes, respectively.

The fuel stream exiting each of fuel distribution tubes 324 mixes with the oxidant stream exiting corresponding oxidant distribution tubes 314 and is combusted in burner cavity 330 (shown in FIG. 1) to produce a hot burner exhaust stream. Combustion may be initiated by a conventional ignitor (not shown). Typically, the ignitor is only required to initiate start fuel combustion and thereafter combustion is self-sustaining as long as fuel and oxidant are supplied to burner 300. Burner 300 may further comprise flame rod 340 for flame detection as part of a burner management system, if desired.

The hot burner exhaust stream flows over reformer tubes 206 to maintain catalyst beds 228 at a suitable temperature for the steam reforming reactions. The burner exhaust stream may maintain the exit (top) portion of catalyst beds 228 at a temperature in the range of about 600° C. to about 800° C., preferably in the range of about 625° C. to about 775° C. The burner exhaust stream is directed between burner tubes 208 and reformer tubes 206 and exits burner cavity 330. The burner exhaust stream then flows past vaporizer 110, where it is cooled by heat exchange with the fuel/water mixture flowing through vaporizer 110. The cooled burner exhaust stream is then discharged from vessel 100 via burner exhaust outlet 345.

The present steam reformer incorporates start burner elements into a single multi-element burner design. At start-up, oxidant is supplied to oxidant manifold 310 and start fuel from start fuel inlet 352 is supplied to start fuel manifold 350. Start fuel is then directed through the gaps 354 between fuel distribution tubes 324 (as best shown in FIG. 4) and start fuel manifold 350. The start fuel is then directed into oxidant distribution tubes 314 and mixes with the oxidant stream therein. The mixed stream exits oxidant distribution tubes 314, is ignited by the ignitor (not shown), and is combusted in burner cavity 330 to produce a hot burner stream.

The radial inflow of oxidant from oxidant manifold 310 into oxidant distribution tubes 314 promotes the entrainment of the start fuel into the oxidant stream. Thus, oxidant distribution tubes direct the start fuel therein, and prevent the start fuel from entering oxidant manifold 310 and creating a combustion/explosion hazard.

Although FIG. 4 illustrates the present steam reformer having gaps 354 associated with each of fuel distribution tubes 324, it is also possible to have gaps 354 associated with a portion of each of fuel distribution tubes 324. Gaps 354 may comprise annular gaps between each of fuel distribution tubes 324 and start fuel manifold 350. Alternatively, the communicating surfaces of fuel distribution tubes 324 and start fuel manifold 350 may form one or more discrete gaps 354 around the circumference of each fuel distribution tube 324. As a further alternative, gaps 354 may comprise one or more discrete holes in start fuel manifold 350 distributed about the circumference of each of fuel distribution tubes 324. Gaps 354 may be of any suitable dimensions and cross-section.

A plurality of gaps 354 may be formed symmetrically or asymmetrically around each of fuel distribution tubes 324 (in this context, reference is made to radial symmetry or asymmetry). One or more discrete gaps 354 around the circumference of each fuel distribution tube 324 allow the local oxidant-to-fuel ratio to be controlled around the fuel distribution tube. This permits, for example, achieving a higher local oxidant-to-fuel ratio for improved flame-holding characteristics, especially at high overall oxidant-to-fuel ratios at start-up or overall lean operating conditions.

Ignition of the start fuel can be achieved with an electric ignition system, for example. The ignitor may be located within oxidant manifold 310, within and extending from one of fuel distribution tubes 324, or within burner cavity 330.

Where the positions of the fuel and oxidant manifolds are reversed (see discussion above), the gaps in start fuel manifold 350 alternatively comprise distribution tubes extending into the inlet ends of the oxidant distribution tubes. However, the arrangement discussed in the preceding paragraph is generally preferred.

The hot burner exhaust stream heats reformer tubes 206, as described. Start fuel is combusted until catalyst beds 228 reach a predetermined temperature, preferably within the desired operating temperature range of the steam reforming catalyst. Once a predetermined temperature has been reached in catalyst beds 228, supply of start fuel to burner 300 may be interrupted and normal operation may be commenced, as described above. Alternatively, combustion of start fuel may be continued for some time after catalyst beds 228 have reached the desired temperature. For example, in fuel cell applications where the burner fuel for the present reformer is normally anode exhaust, start fuel may continue to be combusted until the associated fuel cell stack is capable of providing sufficient anode exhaust to sustain combustion in burner 300, at which time supply of start fuel may be interrupted and normal operation initiated.

EXAMPLE 1

A reformer similar to the embodiment illustrated in FIGS. 1–4 was constructed. The relevant design parameters are:

| | |
|---|---|
| Number of reformer tubes: | 7 |
| Tube diameter: | 3.18 cm (1.25 in) |
| Catalyst bed length: | 66 cm (26 in) |

Two different catalysts were tested in the reformer. One was a commercially available pelletized nickel alumina steam reforming catalyst. The other comprised a metal foam support obtained from Porvair (FeCrAlY alloy; 20 ppi (pores per linear inch); 20% porosity; 10% relative density), washcoated with nickel steam reforming catalyst. Relevant characteristics of the catalysts are shown in Table 1.

TABLE 1

| | Pellets | Foam |
|---|---|---|
| Catalyst shape | spherical | donut |
| Pellet dia./Foam height | 3 mm | 25.4 mm |
| Catalyst volume | 2.6 l | 2.6 l |
| Mass of nickel in catalyst | 390 g | 50 g |
| Percentage nickel in catalyst | 12% | 2.4% |

The pressure drop through each catalyst bed was determined by flowing natural gas through the reformer at 0.06 gmol/s. After correcting for the pressure drop due to the reformer vessel, the pressure drop through the pelletized catalyst bed was 7.31 kPa, and the pressure drop through the metal foam catalyst bed was 2.1 kPa.

The fuel conversion performance of the reformer with each catalyst bed was then tested. The baseline test conditions were as follows:

| | |
|---|---|
| Natural gas flow: | 0.06 gmol/s |
| Process water flow: | 11.1 kg/hr |
| Total burner flow: | 0.88 gmol/s |
| Process inlet temperature: | 343° C. |
| Adiabatic flame temperature: | 1065° C. |

After about 70 thermal cycles, both the pelletized and metal foam catalyst beds had normalized fuel conversions rates of about 82%.

At the baseline conditions, the metal foam catalyst bed reformer configuration achieved similar performance to the pelletized bed configuration with substantially less nickel. The 20 ppi metal foam support contained only 2.4% Ni (50 g) compared to 12% Ni (390 g) in the pellets. This is an 87% reduction in nickel mass. In addition to providing cost savings using base metal catalysts, like nickel, such a reduction in catalyst mass may make precious metal catalysts such as platinum and rhodium more economically practical, which could provide significant system benefits.

The present steam reformer may be employed to reform any suitable fuel, particularly paraffinic naphthas and lighter fuels. In stationary fuel cell electric power generation system applications, for example, natural gas (methane) and propane are suitable fuels.

The multiple tube design of the present steam reformer may be preferable to single tube reformer designs for several reasons.

For example, for a given size of reformer, smaller reformer tubes may be used. Compared to larger reformer tubes, the thermal expansion of smaller tubes is significantly less, which may reduce catalyst crushing due to thermal cycling.

As another example, the use of smaller tubes results in a smaller catalyst bed cross-sectional width relative to comparable single reformer tube designs. Smaller bed width permits lower reformer tube wall temperatures because of increased heat transfer efficiency. As a result, the reformer tubes may be made thinner. Thinner reformer tubes may be lighter and less costly to manufacture than thicker reformer tubes.

Further, for a given size of reformer, multiple smaller reformer tubes have a greater surface area than a single larger reformer tube. The greater surface area results in a lower average heat flux, which also permits lower reformer tube wall temperatures, and thus may also permit the use of thinner reformer tubes.

As another example, multiple reformer tubes may be shorter than a single reformer tube in a reformer of comparable output. Also, in the present steam reformer, fuel is directed to the reformer tubes in a parallel flow arrangement. Shorter tubes and parallel flow of fuel may permit a lower pressure drop across the catalyst beds. As a result, fluidization of the catalyst beds may be reduced or eliminated. In fuel processing system applications, lower-pressure operation of the steam reformer may also increase system efficiency by reducing the parasitic load associated with pressurizing the fuel stream.

As a further example, the present reformer may also permit the use of less catalyst for a given reformer output. Typically, the rate of the steam reforming reaction, and hence the output of the reformer, is limited by the heat transfer rate from the burner to the catalyst bed. Compared to single reformer tube designs, the greater surface area and smaller catalyst bed width of multiple tubes provide for an increased heat transfer rate, and therefore, an increased reformate output for a given amount of catalyst. Thus, the present reformer may achieve a comparable output using less catalyst, compared to single reformer tube designs. This may also translate into cost and weight savings with the present reformer.

Where the present reformer comprises a catalyst on a foam support, such as a metal foam support, it may provide further advantages. For example, the metal foam catalyst bed can provide similar fuel conversion as a pelletized bed at about ⅓ the process pressure drop. The reduction in process pressure drop can provide cost reduction related to fuel compression. It may also be possible to increase the process fuel throughput relative to pelletized beds. This may result in increased hydrogen production per unit catalyst volume, which may permit a further reduction in reformer size and cost.

Metal foam supports, in particular, provide for improved heat transfer from the burner gases to the process gas, including heat transfer by radiation, convection, and conduction. Radiation especially is improved because of improved beam paths through the foam. The improved heat transfer may allow a reduction in reformer size and cost.

As illustrated in Example 1, the use of metal foam supported catalyst permits a reduction in the amount of catalyst used relative to pelletized beds, potentially further reducing overall catalyst costs, depending on the cost of the foam support. Foam supports may also permit the use of precious metal catalysts that also offer potential system advantages such as eliminating nickel carbonyl issues and reducing the risk of catalyst coking.

The burner of the present steam reformer combines start-up and normal operation elements in a single unit having a simple design. In fuel cell-related applications, the burner may normally operate on anode and cathode exhaust, for example, whereas the start fuel is preferably the same as the fuel supplied to the reforming section of the reformer. In fuel cell electric power generation applications, for example, the burner of the present steam reformer is capable of operating on natural gas and air (start-up mode), a reformate and air (transition or "hot standby" mode), and the fuel cell anode and cathode exhaust (normal operation mode).

The fuel and oxidant manifolds and associated distribution tubes may use a shell-and-tube construction, for example, for low-cost manufacturing. The burner may comprise an array of distribution tubes, such as a hexagonal array, for example.

The reformer section of the present steam reformer also employs shell-and-tube construction that is amenable to low-cost, high-volume manufacturing. The reformer tubes may be arranged in an array having a high packing density, such as a hexagonal array, for example, in order to reduce the size and cost of the reformer.

The reformer tubes of the present steam reformer also employ a simplified bayonet regenerative design. Other bayonet regenerative reformer tube designs typically employ three nested tubes, which can be expensive and also has the potential to create problems due to shifting of the tubes during thermal cycling. The present steam reformer comprises bayonet regenerative reformer tubes having a pair of nested reformer tubes. This design may decrease the construction costs associated with the reformer tubes, as well as simplifying thermal cycling-related concerns.

The bottom pan of the present reformer also provides a simple and cost-effective system for catalyst fines collection.

In addition, the present steam reformer is scalable from about 1 kW to multi-megawatt designs. It is capable of low pressure and high pressure reformer operation, and may be incorporated into fuel processing systems suitable for applications such as fuel cell electric power generation systems and merchant hydrogen production.

Finally, as mentioned above, current steam reformers designed for fuel cell applications have typical start-up times of from about one to four hours. The present steam reformer may have a start-up time of as little as 10 to 20 minutes.

While particular elements, embodiments and applications of the present invention have been shown and described, it will be understood, of course, that the invention is not limited thereto since modifications may be made by those skilled in the art, particularly in light of the foregoing teachings. It is therefore contemplated that the appended claims cover such modifications as incorporate those features which come within the scope of the invention.

What is claimed is:

1. A steam reformer for converting a fuel into a reformate stream comprising hydrogen, said reformer comprising a closed vessel and a burner disposed within said vessel, said burner comprising:

(a) a start fuel manifold for receiving and distributing a start fuel stream;

(b) an oxidant manifold for receiving and distributing an oxidant stream, said oxidant manifold having a plurality of oxidant distribution tubes, each of said oxidant distribution tubes having an inlet end and an outlet end, said oxidant distribution tubes disposed in a separator member; and (c) a burner fuel manifold for receiving and distributing a burner fuel stream, said burner fuel manifold comprising a plurality of burner fuel distribution tubes, each of said burner fuel distribution tubes having an inlet end and an outlet end, said burner fuel distribution tubes extending through said start fuel manifold and said oxidant manifold and fluidly isolated therefrom, wherein said outlet end of each of said plurality of burner fuel distribution tubes extends into said inlet end of one of said oxidant distribution tubes, forming a gap between the outer wall of said burner fuel distribution tube and the inner wall of said oxidant distribution tube, and said start fuel manifold has one or more openings therein associated with at least a portion of said burner fuel distribution tubes.

2. A steam reformer for converting a fuel into a reformate stream comprising hydrogen, said reformer comprising a closed vessel and a burner disposed within said vessel, said burner comprising:

(a) a burner fuel manifold for receiving and distributing a burner fuel stream, said burner fuel manifold having a plurality of burner fuel distribution tubes, each of said burner fuel distribution tubes having an inlet end and an outlet end, said burner fuel distribution tubes disposed in a separator member;

(b) an oxidant manifold for receiving and distributing an oxidant stream, said oxidant manifold comprising a plurality of oxidant distribution tubes, each of said oxidant distribution tubes having an inlet end and an outlet end, said oxidant distribution tubes extending through said burner fuel manifold and fluidly isolated therefrom; and (c) a start fuel manifold for receiving and distributing a start fuel stream, said start fuel manifold comprising a plurality of start fuel distribution tubes, each of said start fuel distribution tubes having an inlet end and an outlet end, said start fuel distribution tubes extending through said oxidant manifold and fluidly isolated therefrom, wherein said outlet end of each of said plurality of oxidant distribution tubes extends into said inlet end of one of said burner fuel distribution tubes, forming a first gap between the outer wall of said oxidant distribution tube and the inner wall of said burner fuel distribution tube, and said outlet end of each of said start fuel distribution tubes extends into said inlet end of a corresponding one of said oxidant distribution tubes, forming a second gap between the outer wall of said start fuel distribution tube and the inner wall of said oxidant distribution tube.

3. The reformer of claim 1 wherein said plurality of burner fuel distribution tubes and said plurality of oxidant distribution tubes are arranged in a hexagonal array.

4. The reformer of claim 1 wherein the gaps formed between said burner fuel distribution tubes and said oxidant distribution tubes are annular gaps.

5. The reformer of claim 1 wherein said openings in said start fuel manifold comprise one or more discrete openings distributed around the circumference of at least a portion of said burner fuel distribution tubes.

6. The reformer of claim 5 wherein said openings are asymmetrically distributed around the circumference of each of said burner fuel distribution tubes.

7. The reformer of claim 1 wherein at least a portion of said burner fuel distribution tubes extend through and correspond to said openings in said start fuel manifold, forming at least one gap between the outer wall of each of said burner fuel distribution tubes and corresponding said opening.

8. The reformer of claim 7 wherein said gaps between the outer walls of said burner fuel distribution tubes and corresponding said openings are annular gaps.

9. The reformer of claim 7 wherein said at least one gap between at least a portion said burner fuel distribution tubes and corresponding said openings of said start fuel manifold comprises a plurality of gaps.

10. The reformer of claim 9 wherein said gaps between at least a portion of said burner fuel distribution tubes and corresponding said openings of said start fuel manifold are asymmetrically distributed around the circumference of each of said burner fuel distribution tubes.

11. The reformer of claim 1 wherein said separator member comprises insulating material.

12. The reformer of claim 11 wherein said insulating material comprises a ceramic.

13. The reformer of claim 1, further comprising a plurality of substantially cylindrical reformer tubes disposed within said vessel, each of said reformer tubes comprising an outer tube, a substantially concentric inner gas return tube, and an annular catalyst bed defined by the volume between said outer tube and said inner gas return tube.

14. The reformer of claim 13 wherein said catalyst bed comprises catalyst pellets.

15. The reformer of claim 13 wherein said catalyst bed comprises a foam support.

16. The reformer of claim 13 wherein said catalyst bed comprises a metal foam support.

17. The reformer of claim 16 wherein said metal foam support comprises a FeCrAlY alloy.

18. The reformer of claim 13 wherein said reformer tubes further comprise at least one stabilizer member connected to said inner gas return tube and interposed between said outer tube and said inner gas return tube.

19. The reformer of claim 18 wherein said at least one stabilizer member comprises at least one annular perforated plate extending radially from said inner gas return tube.

20. The reformer of claim 18 wherein said at least one stabilizer member comprises at least one fin extending axially from said inner gas return tube.

21. The reformer of claim 13, further comprising a vaporizer disposed within said vessel for receiving and vaporizing a stream comprising water.

22. The reformer of claim 21 wherein said vaporizer comprises a finned tube helical coil.

23. The reformer of claim 21 wherein said vaporizer comprises a corrugated tube helical coil.

24. The reformer of claim 1, further comprising:
a plurality of substantially cylindrical reformer tubes disposed within said vessel, each of said reformer tubes comprising an outer tube, a substantially concentric inner gas return tube, and an annular catalyst bed defined by the volume between said outer tube and said inner gas return tube;
a plenum disposed within said vessel for receiving said reformate, said plenum having a floor plate;
a bottom pan disposed within said plenum, said bottom pan substantially in the shape of an inverted bowl and having at least one hole therein; and
a reformate outlet extending from said floor plate into said plenum in the region defined by the cooperating surfaces of said bottom pan and said floor plate.

25. The reformer of claim 24 wherein said catalyst bed comprises catalyst pellets.

26. The reformer of claim 24 wherein said catalyst bed comprises a foam support.

27. The reformer of claim 24 wherein said catalyst bed comprises a metal foam support.

28. The reformer of claim 27 wherein said metal foam support comprises a FeCrAlY alloy.

29. The reformer of claim 24 wherein said reformer tubes further comprises at least one stabilizer member connected to said inner gas return tube and interposed between said outer tube and said inner gas return tube.

30. The reformer of claim 29 wherein said at least one stabilizer member comprises at least one annular perforated plate extending radially from said inner gas return tube.

31. The reformer of claim 29 wherein said at least one stabilizer member comprises at least one fin extending axially from said inner gas return tube.

32. The reformer of claim 24, further comprises a vaporizer disposed within said vessel for receiving and vaporizing a stream comprising water.

33. The reformer of claim 32 wherein said vaporizer comprises a finned tube helical coil.

34. The reformer of claim 32 wherein said vaporizer comprises a corrugated tube helical coil.

* * * * *